United States Patent
Nichols et al.

(10) Patent No.: US 8,577,802 B1
(45) Date of Patent: Nov. 5, 2013

(54) ON-DEMAND CASH TRANSPORT

(75) Inventors: Michelle Nichols, Rock Hill, SC (US); Todd Atwood, Charlotte, NC (US); James Heddleson, Charlotte, NC (US); Amy Folk, Charlotte, NC (US); Dan Bohen, Charlotte, NC (US); Felix Mon, Jacksonville, FL (US); Veralyn Hensley, Folsom, CA (US)

(73) Assignee: Bank of America Corporation, Charlotte, NC (US)

( * ) Notice: Subject to any disclaimer, the term of this patent is extended or adjusted under 35 U.S.C. 154(b) by 469 days.

(21) Appl. No.: 12/262,928

(22) Filed: Oct. 31, 2008

Related U.S. Application Data

(60) Provisional application No. 61/061,987, filed on Jun. 16, 2008.

(51) Int. Cl.
*G06Q 40/00* (2012.01)

(52) U.S. Cl.
USPC .............................................. 705/41; 705/35

(58) Field of Classification Search
USPC ..................................................... 705/41, 35
See application file for complete search history.

(56) References Cited

U.S. PATENT DOCUMENTS

| | | | |
|---|---|---|---|
| 3,618,059 A | 11/1971 | Allen | |
| 4,352,097 A | 9/1982 | Hamann | |
| 4,443,692 A | 4/1984 | Nishimura | |
| 4,992,648 A | 2/1991 | Hutchison | |
| 5,453,601 A | 9/1995 | Rosen | |
| 5,533,605 A | 7/1996 | Mays et al. | |
| 5,561,281 A | 10/1996 | Eda et al. | |
| 5,689,240 A | 11/1997 | Traxler | |
| 5,748,906 A | 5/1998 | Sandig | |
| 5,748,908 A | 5/1998 | Yu | |
| 5,900,607 A | 5/1999 | Awatsu et al. | |

(Continued)

FOREIGN PATENT DOCUMENTS

| | | |
|---|---|---|
| DE | 4019265 C1 | 11/1991 |
| DE | 4429815 | 2/1996 |

(Continued)

OTHER PUBLICATIONS

PR_Newswire; "Airbone Express Announces New Pricing"; New York; Jan. 29, 2001.*

(Continued)

*Primary Examiner* — Edward Chang
(74) *Attorney, Agent, or Firm* — Banner & Witcoff, Ltd.; Michael A. Springs

(57) ABSTRACT

An aspect of the invention provides methods and computer media to support on-demand transportation shipments, supply order requests, change orders, and reports. A bank and business partners may coordinate so that a client can schedule pickups of deposits, delivery of change orders, transportation shipments, and reports. When at least one deposit is created at a banking center for one or more banking customers and an aggregate deposit amount exceeds a predetermined amount, an on-demand pickup of the deposits at the banking center is automatically requested. Also, an on-demand pickup of deposits may be automatically requested at a bank customer's location when the aggregate deposit amount exceeds a predetermined threshold. Moreover, an on-demand change, supply order, or report order may be automatically submitted when available cash is below a predetermined threshold. The available cash may be based on a total amount of cash or on a currency denomination amount.

28 Claims, 8 Drawing Sheets

(56) References Cited

U.S. PATENT DOCUMENTS

| | | |
|---|---|---|
| 5,936,220 A | 8/1999 | Hoshino et al. |
| 5,952,639 A | 9/1999 | Ohki et al. |
| 5,952,920 A | 9/1999 | Braddick |
| 5,953,423 A | 9/1999 | Rosen |
| 5,963,131 A | 10/1999 | D'Angelo et al. |
| 6,028,517 A | 2/2000 | Sansone et al. |
| 6,047,807 A | 4/2000 | Molbak |
| 6,055,438 A | 4/2000 | Winner, Jr. |
| 6,122,625 A | 9/2000 | Rosen |
| 6,167,378 A | 12/2000 | Webber, Jr. |
| 6,260,024 B1 | 7/2001 | Shkedy |
| 6,378,770 B1 | 4/2002 | Clark et al. |
| 6,483,433 B2 | 11/2002 | Moskowitz et al. |
| 6,487,542 B2 | 11/2002 | Ebata et al. |
| 6,491,216 B1 | 12/2002 | May |
| 6,498,603 B1 | 12/2002 | Wallace |
| 6,502,746 B1 | 1/2003 | Do et al. |
| 6,523,742 B1 | 2/2003 | Awatsu et al. |
| 6,526,273 B1 | 2/2003 | Link, II et al. |
| 6,633,881 B2 | 10/2003 | Drobish et al. |
| 6,736,314 B2 * | 5/2004 | Cooper et al. ............. 235/380 |
| 6,788,203 B1 | 9/2004 | Roxbury et al. |
| 6,845,905 B2 | 1/2005 | Blad et al. |
| 7,004,385 B1 | 2/2006 | Douglass |
| 7,042,360 B2 | 5/2006 | Light et al. |
| 7,076,458 B2 | 7/2006 | Lawlor et al. |
| 7,149,336 B2 | 12/2006 | Jones et al. |
| 7,201,313 B1 | 4/2007 | Ramachandran |
| 7,212,992 B1 | 5/2007 | Kanevsky et al. |
| 7,216,800 B1 | 5/2007 | Ramachandran |
| 7,243,080 B2 | 7/2007 | Bhadra |
| 7,248,160 B2 | 7/2007 | Mangan et al. |
| 7,284,692 B1 | 10/2007 | Douglass |
| 7,348,886 B2 | 3/2008 | Himberger et al. |
| 7,350,230 B2 | 3/2008 | Forrest |
| 7,375,638 B2 | 5/2008 | Light et al. |
| 7,461,780 B2 | 12/2008 | Potts et al. |
| 7,474,217 B2 | 1/2009 | Himberger et al. |
| 7,537,153 B2 | 5/2009 | Hurwitz et al. |
| 7,577,612 B2 | 8/2009 | Waller et al. |
| 7,588,185 B2 | 9/2009 | Berquist et al. |
| 7,623,033 B2 | 11/2009 | Ainsworth et al. |
| 7,659,816 B2 | 2/2010 | Wandel |
| 7,714,708 B2 | 5/2010 | Brackmann et al. |
| 7,719,423 B2 | 5/2010 | Himberger et al. |
| 7,748,610 B2 | 7/2010 | Bell et al. |
| 7,778,456 B2 | 8/2010 | Jones et al. |
| 7,908,188 B2 | 3/2011 | Flynn et al. |
| 2001/0051922 A1 | 12/2001 | Waller et al. |
| 2001/0054643 A1 | 12/2001 | Siemens |
| 2002/0052193 A1 | 5/2002 | Chetty |
| 2002/0052794 A1 | 5/2002 | Bhadra |
| 2002/0091937 A1 | 7/2002 | Ortiz |
| 2002/0095588 A1 | 7/2002 | Shigematsu et al. |
| 2002/0111916 A1 | 8/2002 | Coronna et al. |
| 2002/0138424 A1 | 9/2002 | Coyle |
| 2002/0194122 A1 | 12/2002 | Knox et al. |
| 2002/0195309 A1 | 12/2002 | Pope |
| 2003/0011466 A1 | 1/2003 | Samuel et al. |
| 2003/0050891 A1 | 3/2003 | Cohen |
| 2003/0061153 A1 * | 3/2003 | Birdsong et al. ............. 705/39 |
| 2003/0083936 A1 | 5/2003 | Mueller et al. |
| 2003/0122671 A1 | 7/2003 | Jespersen |
| 2003/0163710 A1 | 8/2003 | Ortiz et al. |
| 2003/0177102 A1 | 9/2003 | Robinson |
| 2003/0208431 A1 | 11/2003 | Raynes et al. |
| 2003/0213843 A1 | 11/2003 | Jackson |
| 2003/0234719 A1 | 12/2003 | Denison et al. |
| 2004/0016796 A1 | 1/2004 | Hanna et al. |
| 2004/0056767 A1 | 3/2004 | Porter |
| 2004/0083149 A1 | 4/2004 | Jones |
| 2004/0100379 A1 | 5/2004 | Boman et al. |
| 2004/0111346 A1 | 6/2004 | Macbeath et al. |
| 2004/0124966 A1 | 7/2004 | Forrest |
| 2004/0201454 A1 | 10/2004 | Waterhouse et al. |
| 2005/0027594 A1 * | 2/2005 | Yasnovsky et al. ............. 705/14 |
| 2005/0091129 A1 | 4/2005 | Tien |
| 2005/0108164 A1 | 5/2005 | Salafia, III et al. |
| 2005/0183928 A1 | 8/2005 | Jones et al. |
| 2005/0258234 A1 | 11/2005 | Silverbrook et al. |
| 2005/0273347 A1 | 12/2005 | Dudley et al. |
| 2006/0120519 A1 * | 6/2006 | Tamari et al. ............. 379/114.2 |
| 2006/0131395 A1 | 6/2006 | Potts et al. |
| 2006/0247973 A1 | 11/2006 | Mueller et al. |
| 2006/0271441 A1 | 11/2006 | Mueller et al. |
| 2006/0282277 A1 | 12/2006 | Ng |
| 2006/0288233 A1 | 12/2006 | Kozlay |
| 2007/0005452 A1 | 1/2007 | Klingenberg et al. |
| 2007/0008118 A1 | 1/2007 | Kassiedass |
| 2007/0012602 A1 | 1/2007 | Baldassari et al. |
| 2007/0034693 A1 | 2/2007 | Jouvin et al. |
| 2007/0063016 A1 | 3/2007 | Myatt et al. |
| 2007/0174156 A1 | 7/2007 | Emde et al. |
| 2007/0198341 A1 * | 8/2007 | Park ............. 705/14 |
| 2007/0226142 A1 | 9/2007 | Hanna et al. |
| 2007/0282724 A1 | 12/2007 | Barnes et al. |
| 2008/0005019 A1 * | 1/2008 | Hansen ............. 705/39 |
| 2008/0005578 A1 | 1/2008 | Shafir |
| 2008/0103959 A1 | 5/2008 | Carroll et al. |
| 2008/0120237 A1 | 5/2008 | Lin |
| 2008/0126515 A1 * | 5/2008 | Chambers et al. ............. 709/218 |
| 2008/0149706 A1 | 6/2008 | Brown et al. |
| 2008/0155269 A1 | 6/2008 | Yoshikawa |
| 2008/0199155 A1 | 8/2008 | Hagens et al. |
| 2008/0223930 A1 | 9/2008 | Rolland et al. |
| 2008/0262949 A1 | 10/2008 | Bond et al. |
| 2008/0265019 A1 | 10/2008 | Artino et al. |
| 2008/0303903 A1 | 12/2008 | Bentley et al. |
| 2009/0006249 A1 | 1/2009 | Morgan et al. |
| 2009/0006250 A1 | 1/2009 | Bixler et al. |
| 2009/0032580 A1 | 2/2009 | Blachowicz et al. |
| 2009/0051566 A1 | 2/2009 | Olsen et al. |
| 2009/0051769 A1 | 2/2009 | Kuo et al. |
| 2009/0065573 A1 | 3/2009 | Potts et al. |
| 2009/0107800 A1 | 4/2009 | Nishida et al. |
| 2009/0114716 A1 | 5/2009 | Ramachandran |
| 2009/0164364 A1 | 6/2009 | Galit et al. |
| 2009/0187482 A1 | 7/2009 | Blount et al. |
| 2009/0216662 A1 | 8/2009 | Crist et al. |
| 2010/0052844 A1 | 3/2010 | Wesby |
| 2010/0076853 A1 * | 3/2010 | Schwarz ............. 705/15 |
| 2010/0274723 A1 | 10/2010 | Joab |

FOREIGN PATENT DOCUMENTS

| | | |
|---|---|---|
| DE | 19512045 | 10/1996 |
| DE | 19846452 | 12/1999 |
| DE | 20013021 | 11/2000 |
| DE | 102004039365 | 2/2006 |
| DE | 102005047711 | 4/2007 |
| EP | 1477949 | 11/2004 |
| GB | 2304953 | 3/1997 |
| WO | 9933040 A | 7/1999 |
| WO | 03034359 A | 4/2003 |
| WO | 2005041385 | 5/2005 |
| WO | 2005106722 | 11/2005 |

OTHER PUBLICATIONS

Anonymous; "Parcel Pickup now a click away at Canada Post"; Canada Newswire; Aug. 31, 2011.*

Notice of References Cited in related U.S. Appl. No. 12/262,908.

Non-Final Office mailed Mar. 12, 2010 issued in related U.S. Appl. No. 12/263,041.

Office Action from related U.S. Appl. No. 12/262,534 mailed Jun. 24, 2010 (17 pages).

Final Office Action for U.S. Appl. No. 12/262,908 dated Aug. 18, 2010.

Non-Final Office Action for U.S. Appl. No. 12/262,432 dated Aug. 18, 2010.

Non-Final Office Action for U.S. Appl. No. 12/263,041 dated Sep. 2, 2010.

European Search Report in EP09007879 dated Oct. 1, 2009.

(56) References Cited

OTHER PUBLICATIONS

European Search Report in EP09007878 dated Oct. 1, 2009.
Non-Final Office Action for U.S. Appl. No. 12/262,448 dated Sep. 15, 2010.
Non-Final Office Action for U.S. Appl. No. 12/262,526 dated Sep. 16, 2010.
Office Action for U.S. Appl. No. 12/262,532, mailed Nov. 26, 2010.
Office Action for U.S. Appl. No. 12/262,432, mailed Dec. 7, 2010.
Office Action for U.S. Appl. No. 12/262,522, mailed Feb. 3, 2011.
Office Action for U.S. Appl. No. 12/263,041, mailed Jan. 26, 2011.
Office Action for U.S. Appl. No. 12/262,448, mailed Feb. 1, 2011.
Office Action from related U.S. Appl. No. 12/262,472 mailed Oct. 18, 2010, pp. 1-7.
Office Action for U.S. Appl. No. 12/262,526, mailed Nov. 23, 2010.
Oracle Database SQL Reference, 10g Release 1 (10.1), Part No. B10759-01, Dec. 2003.
Powerpoint Presentation, DTS Product Overview, IFS, Apr. 2006, 17 pages.
Durbin, "Ford's F-150 goes high-tech", retrieved from <http://www.wheels.ca/article/173134>, Feb. 6, 2008, 4 pages.
Monthly Minutes from Banking Technology Operations Standing Committee (BTO), dated Mar. 20, 2007, 2 pages.
Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.
Powerpoint Presentation, Guck, "PakTrak", Cash Shipment Package Tracking Concept Overview, Draft-Version 1.0, Mar. 14, 2008, 17 pages.
Powerpoint Presentation, RFID in Banking, May 21, 2008, 12 pages.
Monthly Minutes for RFID SIG dated Mar. 19, 2008, 2 pages.
International Search Report for PCT/US2009/047452, dated Aug. 25, 2009, pp. 1-4.
Office Action for U.S. Appl. No. 12/262,523, mailed Nov. 9, 2010.
Office Action for U.S. Appl. No. 12/262,115, mailed Nov. 16, 2010.

\* cited by examiner

ON-DEMAND CASH TRANSPORT

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

BACKGROUND

The cash supply chain is manual, complex, has inherent risk issues, and is dispersed throughout a network of customers, armored carriers, the Fed (Federal Reserve), and/or a network of client facing devices including but not limited to automatic teller machines (ATMs), cash vaults, banking centers, safes, cash recyclers, and other cash handling devices. The costs of depositing, distributing, and managing cash across a major bank, as well as the amount of daily excess cash carried by such a bank, can be on the order of billions of dollars.

Today's client deposit process does not adequately allow clients to view the status of their deposit bag as it makes its way from the client's site where the deposit was prepared to the bank or bank's representative who will continue the processing of the deposit. Deposit bags are handled multiple times in the current process (and possibly by many different parties), which increases potential errors and complicates finding missing deposits or understanding where errors occurred and assigning fiduciary responsibility for those errors. Pertinent pieces of deposit data are typically manually entered and reentered into various systems throughout the end-to-end processing of the deposit. The collaboration and sharing of information across multiple organizations and with multiple vendors may make this process very complex and increases risk to the bank and bank clients.

While a number of techniques have been attempted to automate transaction handling, there remains a need to increase the flexibility, efficiency, and accuracy of a cash transaction process that encompasses cash deposits and change orders. Bank customers need to deposit cash and to obtain cash on a timely basis. Consequently, it is desirable to increase the flexibility, convenience, speed, and accuracy of cash transactions and to reduce the labor required to perform the transactions. It is also desirable to make information relating to a cash transaction rapidly available to both the client and the bank and to support cash transactions that accommodate a customer's timely needs.

SUMMARY

The following presents a simplified summary of aspects of the invention in order to provide a basic understanding of some aspects of the invention. This summary is not an extensive overview, and is not intended to identify key or critical elements or to delineate the scope of the claims. The following summary merely presents some concepts and aspects in a simplified form as a prelude to the more detailed description provided below.

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a transporter (e.g., an armored carrier), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a monetary package. Depending upon the location within the cash supply chain, the monetary package may maintain together a quantity of monetary items as a single entity by way of, e.g., a bag (in which the monetary items are placed within the bag, which may be sealed), by way of a cassette for holding the monetary items, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, provide loss prevention, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank.

According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed cash package) may be recognized much earlier, even prior to actual deposit or arrival of the package at the processing site.

Another potential benefit of centralized monetary package tracking may include on-demand transportation shipments, supply order requests, change orders, and reports. A bank and business partners may coordinate so that a client can schedule pickups of deposits, delivery of change orders, transportation shipments, and reports.

According to another aspect, at least one deposit is created at a banking center for one or more banking customers. When an aggregate deposit amount exceeds a predetermined amount, an on-demand pickup of the deposits at the banking center is automatically requested. The pickup request may be for a regularly-designated transport carrier or for the closest transport carrier with respect to the banking center. The predetermined amount may be based on the total deposit amount (e.g., cash+checks+coin) or on the total currency amount.

According to another aspect, an on-demand pickup of deposits may be requested at a bank customer's location when the bank customer has created at least one deposit. When the bank customer has created at least one deposit and when the aggregate deposit amount exceeds a predetermined threshold, the on-demand pickup is automatically requested. However, if a regularly scheduled pickup is expected within a predetermined time duration, the on-demand pickup may be averted.

According to another aspect, an on-demand change order is automatically submitted when available cash is below a predetermined threshold. The available cash may be based on a total amount of cash or on a currency denomination amount.

These and other aspects will be illustratively described in further detail in the Detailed Description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
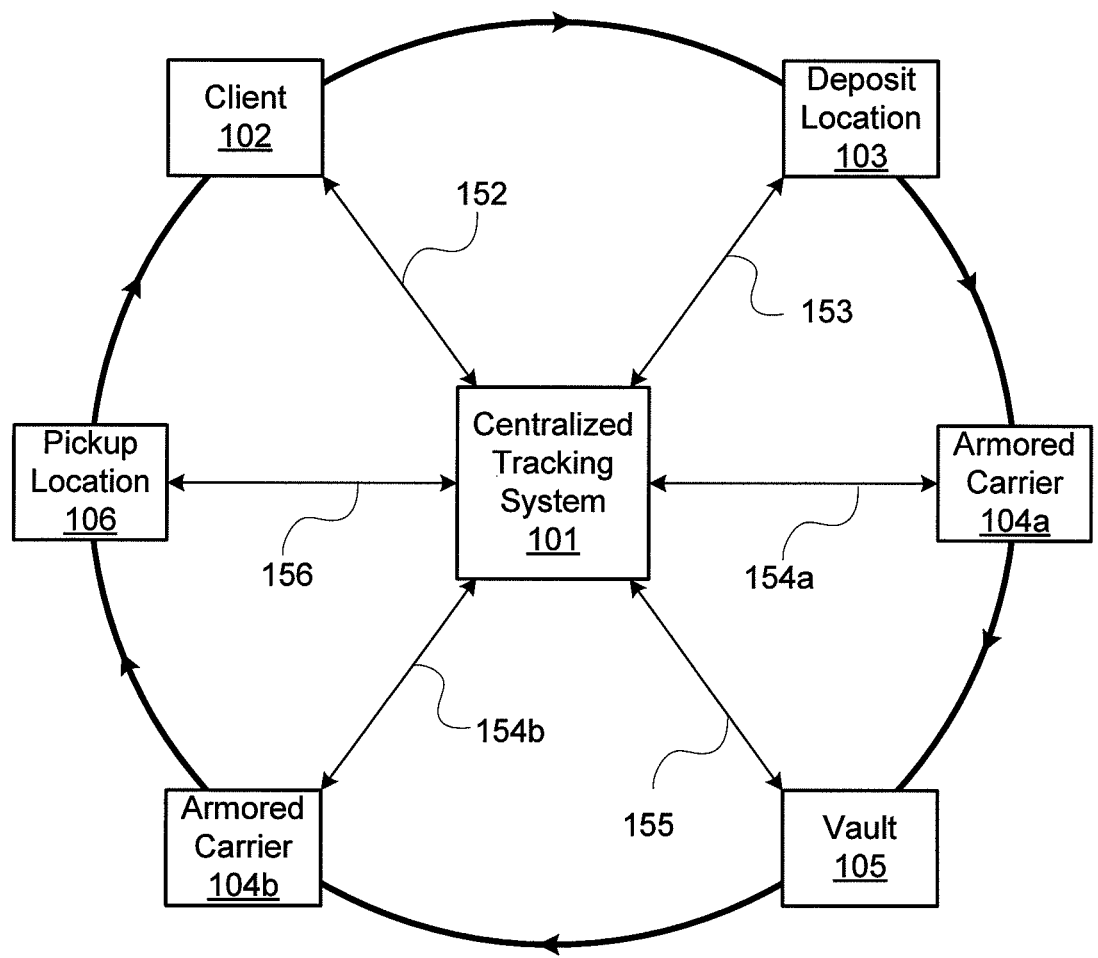
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102, a deposit location 103, an armored carrier 104 or other transport service, a bank vault 105, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, monetary items may be processed internally within a node (e.g., within bank vault 105). Consequently, each node may have a network within itself.

Centralized tracking system 101 may include at least one computing device and at least one computer-readable medium that, together, are configured to receive monetary package status reports from parties such as parties 102-106, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at phone 102a or terminal 102b through a wireless network or the Internet.

Deposit location 103 is the location at which client 102 releases custody of the deposit (such as in the form of a monetary package). This custody may be released by, for instance, depositing the monetary into a cash handling device (e.g., a cash recycler, depository, exchange, dispensing machine, or ATM), or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash handling device.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104a/104b (which may be referred to as a "vendor") transports monetary packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
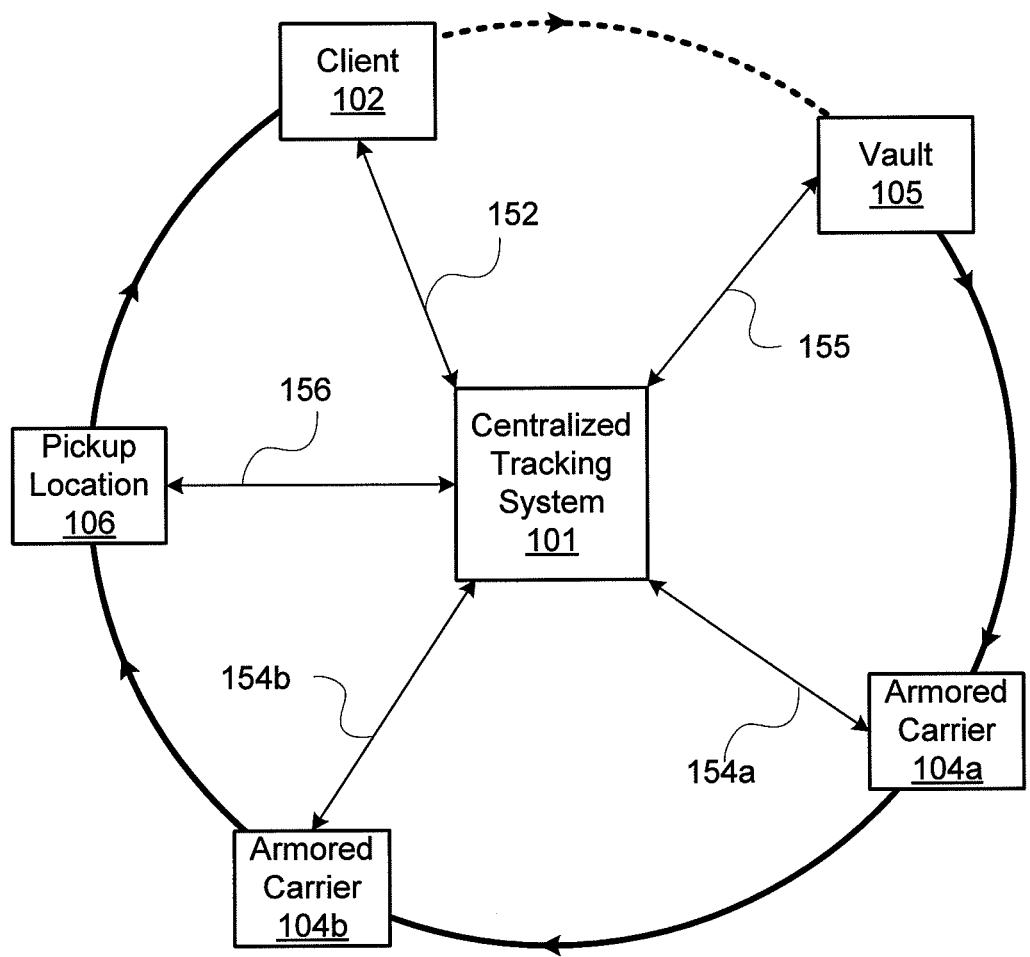
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 1 and 2, a monetary package transfers from party to party, with the exception of the broken line in FIG. 2 that indicates a request by client 102 rather than a physical transfer of a monetary package. Each time the monetary package changes hands and/or changes physical locations, centralized tracking system 101 may be updated. A physical location may two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
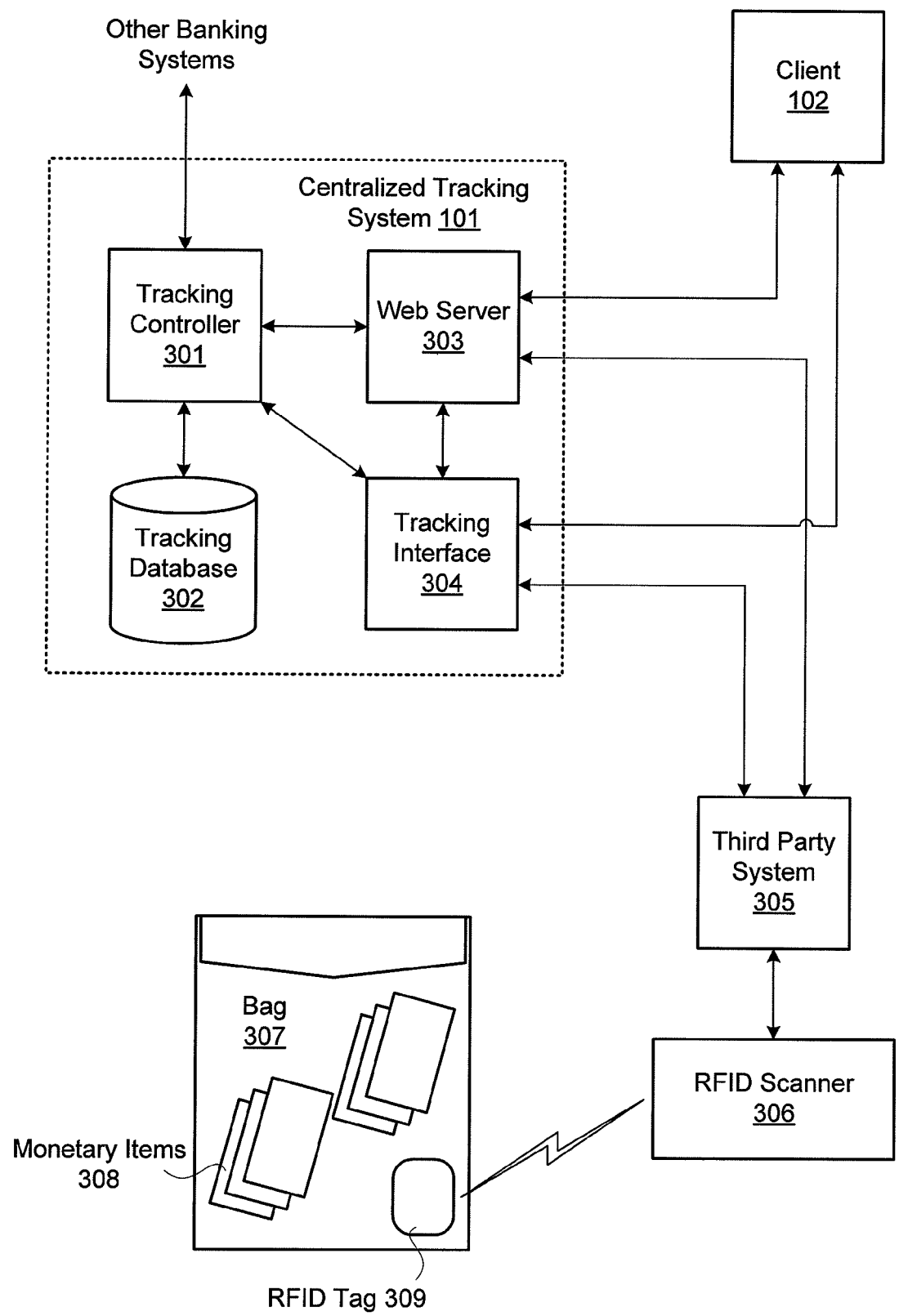
FIG. 3 is a functional block diagram of an illustrative cash package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Each of units 301, 303, and 304 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data. This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a third party system 305 (e.g., the computer system of armored carrier 104). System 305 may be embodied as or otherwise include a computing device, and may further include or be coupled with an identifier reader such as an RFID scanner 306 or a bar code reader. In this example, RFID scanner is configured to read an RFID tag 309 that is contained inside or otherwise attached to a bag 307 that also contains a quantity of monetary items 308. Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

RFID tag 309 may be a passive RFID tag that does not contain its own power source. Rather, a passive RFID tag (e.g., its memory, controller, and transmitter) is powered by power inherent to a signal that is received from RFID scanner 306 or another signal source. Alternatively, RFID tag 309 may be an active RFID tag that contains its own power source.

The above discussion in connection with FIGS. 1-3 describes but a few examples of how monetary package tracking might be implemented. These and other implementations, as well as various features that may be provided in connection with monetary package tracking, will be discussed in further detail below.

A deposit or standard language monetary package (typically contained in a currency bag) may travel along the cash supply chain as the currency bag is tracked using RFIDs.

The cash supply chain is comprised of different stages. For example, six stages may be associated with the cash supply chain. In stage 1, a client prepares a cash and/or check deposit for pick up by an armored carrier at the client site. In stage 2, a bank processes deposit bags or cassettes that are delivered by an armored carrier at cash vault receiving. This stage can be any bank channel where deposits are processed like a banking center or a strategic partner location. In stage 3, a teller is assigned currency bags or cassettes for processing in the cash vault. In stage 4, the teller processes currency bags or cassettes in the cash vault. In stage 5, currency trays are taken to the sorter room after the tellers work has been verified for sorting and vault inventory. In stage 6, requests for cash to a client (change orders) are processed. This stage may indicate that a replenishment is needed.

Embodiments of the invention support on-demand transportation shipments, supply order requests, change orders, and reports. The bank and business partners (e.g., armored carriers, non-bank deposit locations, and so forth) may coordinate so that bank customers (clients) can schedule pickups of deposits, delivery of change orders, transportation shipments, and reports.

Figure 4:
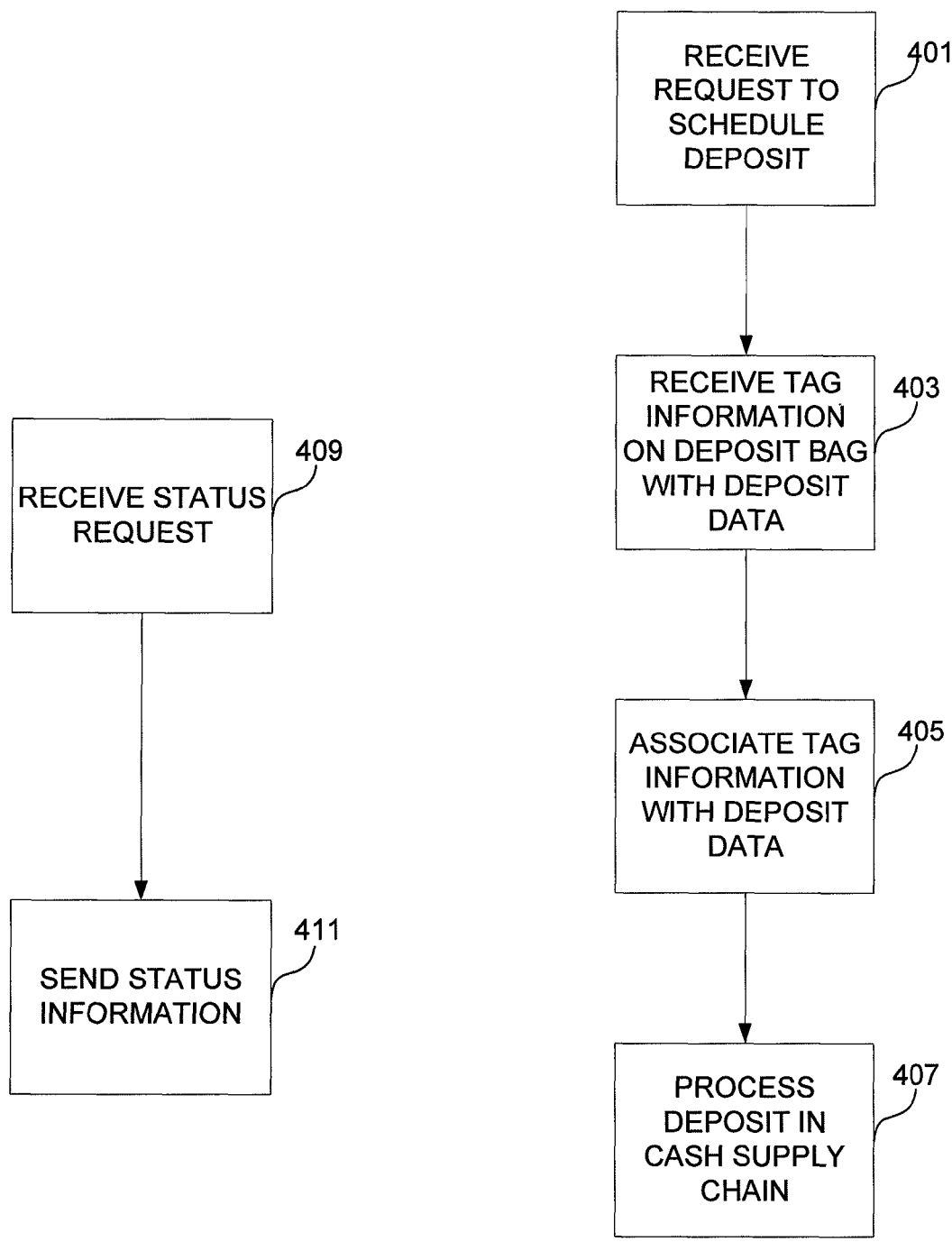
FIG. 4 shows a flow diagram for scheduling a deposit in accordance with an illustrative embodiment.

FIG. 4 shows a flow diagram 400 for scheduling a deposit in accordance with an illustrative embodiment. Process 400 is applicable to a client (e.g., a bank customer) preparing a deposit (monetary items, e.g., cash and/or checks) at the client's site for pick up by an armored carrier (corresponding to stage 1 as discussed above). The definition of "cash" as stated earlier in the specification may include checks and coins. A client may deliver a deposit directly to a banking center or other node where deposits can be dropped (e.g., a depository in a mall location, banking center night drop, intelligent cash manager, and banking center teller).

The client's location may be, for example, at a front-office of a retail chain. The deposit may be made, e.g., at an ATM or banking center or via an armored "pull" from a cash recycler, e.g., an Intelligent Cash Manager (ICM) in the back office. After the client collects cash for the deposit, the client goes to the bank's Internet web site portal (such as the web site generated by web server 303) and clicks on "Payments" to schedule a deposit in step 401 as received by a tracking system (e.g., centralized tracking system 101 as shown in FIG. 1). All of the fields on the web site portal screen may be pre-populated for the client except for the required cash and check amounts. The screen may already know the preparer's ID from the initial sign-in on the portal system. As the amounts are entered, the screen calculates the totals. Consequently, client preparation errors that often lead to deposit correction notices may be reduced. After submitting this "virtual deposit slip", the client can now see that the deposit is in "Created" status on the portal main screen. At this point, this deposit data is now stored in a central database that can be accessible to other downstream applications that can use the initial input data to forecast incoming volumes.

As described previously, monetary packages, such as deposit bags, may have a visible bar code and/or an RFID tag or other wirelessly readable tag, for ease of tracking of the monetary package. While a bar code or other tracking means may be utilized, examples as described herein will use an RFID tag. Flexibility is a key quality of associating the RFID tag to a deposit bag. There are several ways to incorporate the RFID tag into the process. For example, clients may print out their own tags, carriers may provide the tags, deposit bags may have the tags already pre-attached to the bags, or the RFID tag may be embedded in deposit slip.

All of the vendors throughout the cash supply chain (e.g., armored carriers) may be carrying a handheld RFID/Barcode scanner such as RFID scanner 306. Once the carrier scans the tag (e.g., RFID tag 309) with RFID scanner 306, the unique identifier transmitted from RFID 309 tag in step 403 is now associated in tracking database 302 with all the data that the client and/or another party has previously entered, or will update, in the website portal for this deposit in step 405, including the check and cash amounts, denomination counts, date, time, preparer ID, and/or the carrier ID. The identifier of the actual RFID tag 309 itself may be meaningless without access to the database; therefore, all customer data is protected. The association of the identifier of RFID tag 309 produces a status change for the client as displayed on the portal screen. In the exemplary scenario, the portal screen shows "In Transit" and as well as the change of custody to the armored carrier. Customarily, the carrier would give the client a paper receipt indicating the transfer of custody of the deposit. In some embodiments, the receipt may be electronic, and may further be available to be printed by the client from the client's screen if paper is required.

The bank's Internet web site portal may provide end-to-end visibility for both the client and the bank's internal operational monitoring. The portal may allow the user to define passive and active alerts and monitoring of selectable points within the process. For instance, a deposit may be scheduled by a business client with the bank's tracking database 302. The scheduled deposit is associated in database 302 with the tracking identifier (e.g., RFID identifier) or the monetary package to be deposited, along with the cash amount included therein (optionally the amount is specified by denomination). Then, the customer's agent goes to a deposit location and makes the deposit. The deposit event is sensed by an RFID scanner at the deposit location and this event is sent to tracking database 302. Any further events (e.g., pickup by armored carrier, transfer to armored carrier's barn, transfer to bank's cash vault, and the like) along the cash supply chain may further be noted in the database. The customer and/or the bank may be able to go online and check information in the database to see the current status of the monetary package.

The client's deposit is processed in the cash supply chain in step 407, in which an armored carrier may transport the deposit to the bank's cash vault 105 from deposit location 103 as shown in FIG. 1. The status of the deposit in tracking database 302 may be repeatedly updated through communications channels 152-156 as the deposit moves along the cash supply chain.

At any point along the cash supply chain, the client, the bank, or another party may request the status of the deposit in step 409 and receive status from centralized tracking system 101 in step 411 as the deposit is processed along the cash supply chain.

Embodiments support collaboration with internal and external systems and partners to provide on-demand transportation shipments, supply orders requests, change orders and reports. For example, bank and business partners (e.g., armored carriers, non-bank deposit locations, and the like) may coordinate so that bank customers can schedule pickups of deposits, delivery of change orders, transportation shipments, and reports. The scheduling information may also be associated in tracking database 302 with the expected monetary package identifiers.

Embodiments also support daily deposits outstanding tracking/predictive modeling of customer cash position. Using the real time productivity features, tracking database 302 may contain data that allows a report to be generated (e.g., by tracking controller 301) for each client that lets the client know the client's current cash status all along the cash supply chain. In addition, based on the data in tracking database 302, a report may be generated that predicts scheduled deposits, scheduled change orders, and the cash supply chain status, and what the client's cash position will be at a future time (e.g., in 12 hours, 24 hours, 48 hours, or other time period)

Embodiments may support other parameters for consideration, including total transportation cost to date, amount of cash in transit or processing at vault, one-time charge for transportation, and duration periods (3 hours, 24 hours, 48 hours, or other time period) A decision for scheduling a deposit may be based on one selectable parameter, more than one parameter, or the ability to optimize multiple parameters (cost, security, cash flow, and the like). A client may also have the ability to adjust trigger based on real-time deposit correction notice (DCN) information. This trigger may automatically increment or decrement cash in transit and/or change order amount or may be adjusted manually by a client once the alert was received about the DCN. A client may also be able to request DCN research.

Figure 5:
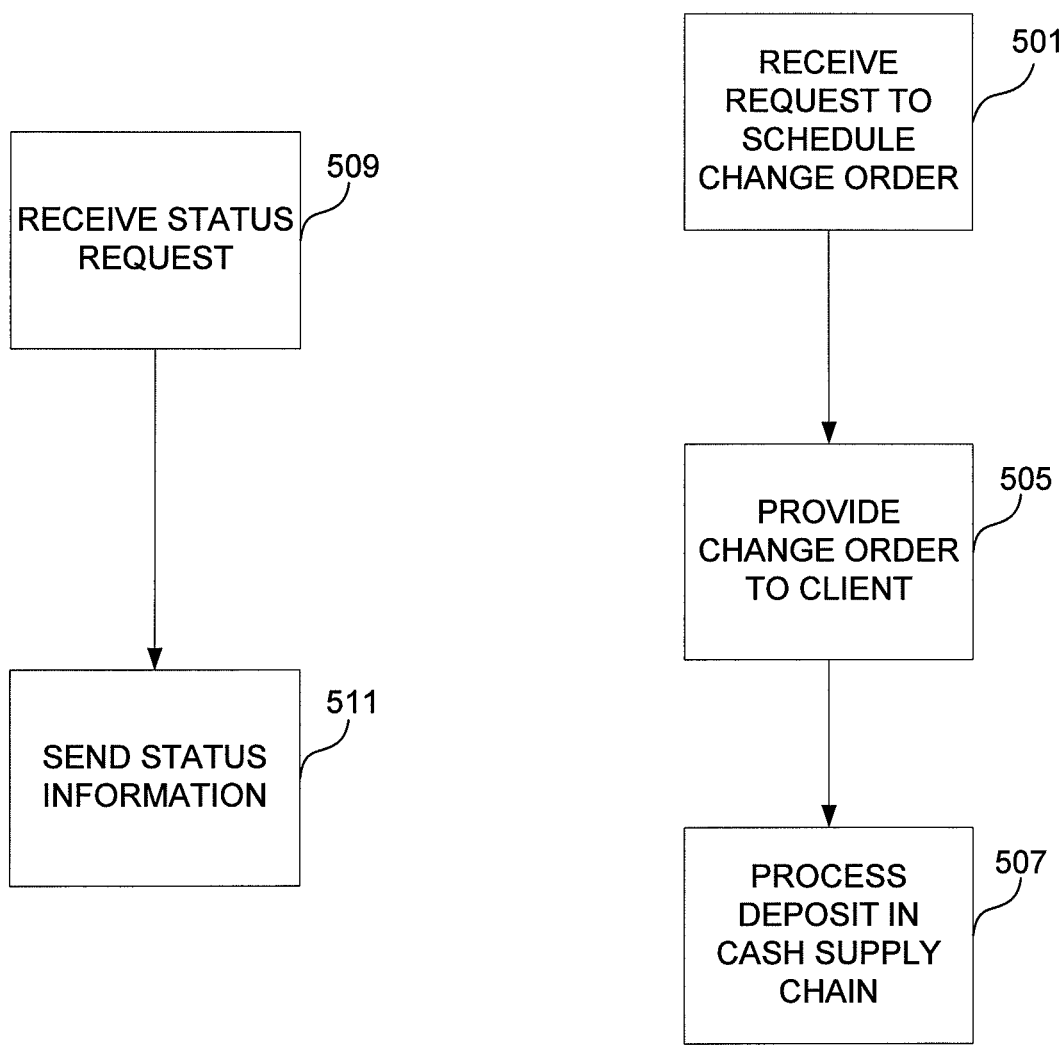
FIG. 5 shows a flow diagram for scheduling a change order in accordance with an illustrative embodiment.

FIG. 5 shows a flow diagram 500 for scheduling a change order in accordance with an illustrative embodiment. As previously discussed, stage 6 in the cash supply chain supports change order processing in which cash vaults not only process incoming cash but also provide cash to clients. In step 501, client requests for cash (change orders) are typically standing orders for specific amounts of currency in specific denominations that are sent on a specific schedule as received by a tracking system (e.g., centralized tracking system 101 as shown in FIG. 1). Once the orders are prepared and filled in step 505, the strapped cash is placed in a bag or otherwise embodied as another type of cash package to be picked up by the armored carrier (or any transportation mode) or delivered by the client in step 507 for eventual delivery to the client. Thus, process 500 completes the cash supply chain cycle for a change order, which starts at the client and ends at the client. Once the change order is picked up by the armored carrier, the client screen in the web portal reflects the incoming order. Additionally, when the change order arrives at the client site, a client that uses RFID scanning for the client's operations may use a handheld scanner (e.g., RFID scanner 306) in the receiving process, thus speeding up their receiving process and creating a true end to end view of the operation.

The client may request the status of the deposit in step 509 and receive status from centralized tracking system 101 in step 511 as the deposit is processed along the cash supply chain.

Figure 6:
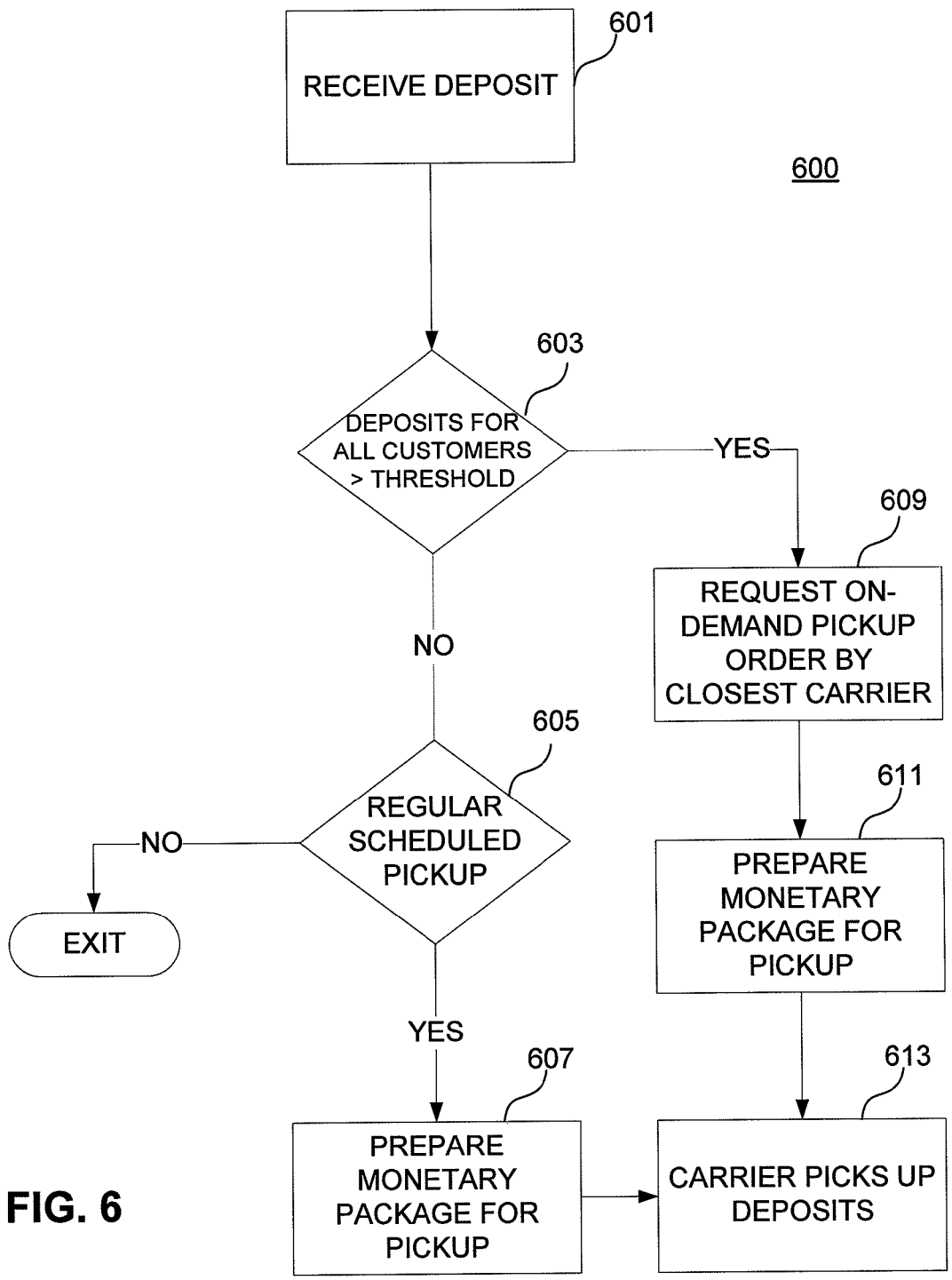
FIG. 6 shows a flow diagram for ordering an on-demand pickup of deposits at a banking location in accordance with an illustrative embodiment.

FIG. 6 shows flow diagram 600 for ordering an on-demand pickup of deposits at a banking location (banking center) in accordance with an illustrative embodiment. (With the associated scenario, a banking customer drops off the deposit at the banking location.) In step 601, a deposit is received from a banking customer at a banking center. The deposit depicted in step 601 is typically one of a plurality of deposits received from different banking customers. If the deposit amount for deposits from different bank customers exceeds a predetermined threshold as determined by step 603, an on-demand pickup is generated for the closest (or otherwise available) transport carrier in step 609. (The banking center typically adjusts the predetermined threshold for an expected deposit amount from a plurality of banking customers over the course of a desired period of time.) The deposit amount may be based on different criteria, including the total deposit amount (which may include only cash or may include both cash and checks) or on the currency denomination amount (e.g., the total number of $100 bills). Alternatively, the deposit amount from only a single banking customer may be compared with a predetermined threshold amount, in order to determine whether an on-demand deposit pickup should be made from that customer. One or more monetary packages are consequently prepared with the deposit(s) in step 611 for the pickup. However, if the relevant deposit amount does not exceed the predetermined threshold, then it is determined in step 605 whether the regular scheduled pickup is expected. For example, regular pickups may be scheduled on Tuesdays and Thursdays. If so, the monetary package is prepared for the regularly scheduled pickup in step 607. Consequently, the transport carrier picks up the deposit in step 613 in accordance with the request.

A client or customer may be internal or external. Embodiments may also apply to supply orders (cash bags, tickets, and the like) or report generation. The client or customer may have the ability to establish thresholds at a specified frequency (hourly, daily, weekly) for some specified duration (monthly, annually, or other time peirod) so that cycles (seasonality, day of week,) may be accounted for systematically. Embodiments may also allow adjustments for one-time events (e.g., sporting events or tax free days). Embodiments may also support emergency change orders that would override any preset triggers.

Figure 7:
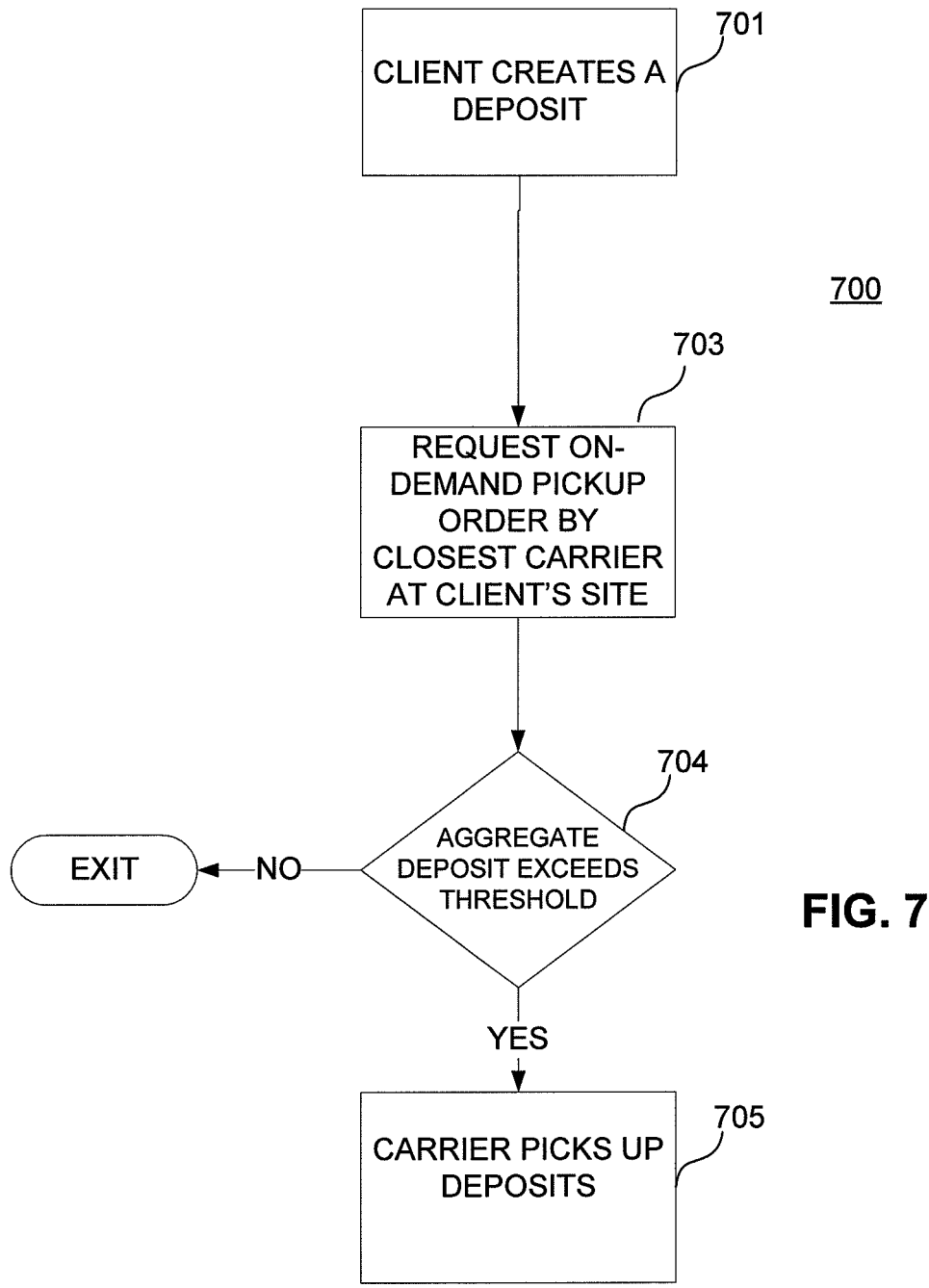
FIG. 7 shows a flow diagram for ordering an on-demand pickup of deposits at a client's location in accordance with an illustrative embodiment.

FIG. 7 shows flow diagram 700 for ordering an on-demand pickup of deposits at a client's location (rather than at a banking center as shown in FIG. 7) in accordance with an illustrative embodiment. With the associated scenario, a deposit is picked up at the client's location rather than the client dropping off the deposit at a banking center. In step 701, a bank customer (client) enters (creates) a deposit through the bank's Internet web site portal (such as the web site generated by web server 303). In step 703, a pickup of the deposit by the closest transport carrier at the customer's site is requested. Consequently, the carrier picks up the deposit in step 705.

However with some embodiments, the bank customer may enter one or more deposits before scheduling a pickup by a transport carrier. For example, the bank customer may enter a deposit for each business day over a course of several days. Also, the bank customer (e.g., a large store) may be organized into separate departments, where each department separately enters a deposit. The aggregate deposit equals the total deposits over one or more deposits. When the aggregate deposit amount exceeds a threshold (as determined by step 704), a process may determine whether a regularly scheduled pickup is expected within predetermined time duration. If so, a monetary package is prepared for the pickup. If not, the process generates an on-demand pickup of the deposits by the closest transport carrier, and a monetary package is prepared for pickup.

Figure 8:
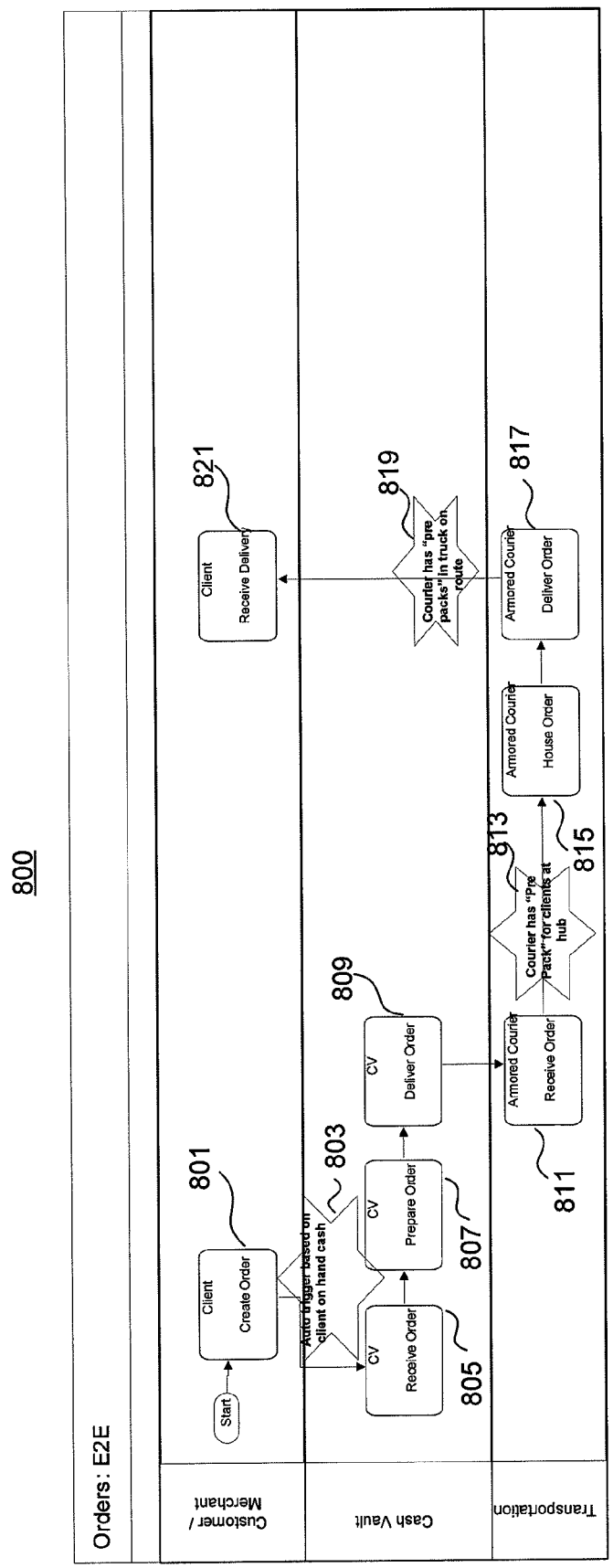
FIG. 8 shows a process for automatically submitting an on-demand change order in accordance with an illustrative embodiment.

FIG. 8 shows process 800 for automatically submitting a change order in accordance with an illustrative embodiment. In step 801, a bank customer creates a change order that specifies different amounts of cash based on denomination. However, the change order is not submitted until the available cash drops below a predetermined amount in step 803. When the order is consequently received by the cash vault of the bank, the change order is prepared in steps 805-809, transported by the armored carrier in steps 811-819 and delivered to the bank customer in step 821.

Any of processes 600-800 may be performed by a processor (e.g., centralized tracking system 101 as shown in FIG. 1) that executes computer-executed instructions from a computer-readable storage medium.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A computer-assisted method comprising:
   receiving a deposit request for a deposit of physical monetary items from a client, at a computing device;
   retrieving a predetermined monetary threshold from a memory device associated with the computing device;
   comparing, by the computing device, the retrieved predetermined threshold with a deposit amount associated with the deposit request to determine whether the deposit amount exceeds the predetermined threshold;
   determining, by the computing device, whether a recurring regularly scheduled physical pickup is scheduled within a predetermined time duration; and
   based on an outcome of the comparing and an outcome of the determining, requesting an on-demand physical pickup of the deposit from the client through a communications channel when the deposit amount is determined to exceed the predetermined threshold and when the recurring regularly scheduled pickup is determined not to be scheduled within the predetermined time duration, such that the on-demand pickup is not requested when the recurring regularly scheduled pickup is determined to be scheduled within the predetermined time duration.

2. The method of claim 1, further comprising:
   determining a carrier; and
   scheduling the on-demand pickup with the carrier.

3. The method of claim 1, wherein the deposit amount is based on a total deposit amount for a plurality of deposits including the deposit.

4. The method of claim 1, wherein the deposit amount is based on a currency denomination amount.

5. The method of claim 1, wherein the predetermined threshold is based on a total amount of currency.

6. The method of claim 1, wherein the on-demand pickup occurs at a banking location.

7. The method of claim 1, wherein the on-demand pickup occurs at a bank customer's location.

8. A computer-readable storage medium storing computer-executable instructions that, when executed, cause a processor to perform a method comprising:
   receiving a deposit request for a deposit of physical monetary items from a client;
   retrieving a predetermined monetary threshold from a memory device;
   comparing the retrieved predetermined threshold with a deposit amount associated with the deposit request to determine whether the deposit amount exceeds the predetermined threshold;
   determining whether a recurring regularly scheduled physical pickup is scheduled within a predetermined time duration; and
   based on an outcome of the comparing and an outcome of the determining, requesting an on-demand physical pickup of the deposit from the client through a communications channel when the deposit amount is determined to exceed the predetermined threshold and when the recurring regularly scheduled pickup is determined not to be scheduled within the predetermined time duration, such that the on-demand pickup is not requested when the recurring regularly scheduled pickup is determined to be scheduled within the predetermined time duration.

9. The computer-readable medium of claim 8, said method further comprising:
   determining a carrier; and
   scheduling the on-demand pickup with the carrier.

10. The computer-readable medium of claim 8, wherein the deposit amount is based on a total deposit amount for a plurality of deposits including the deposit.

11. The computer-readable medium of claim 8, wherein the deposit amount is based on a currency denomination amount.

12. The computer-readable medium of claim 8, wherein the predetermined threshold is based on a total amount of currency.

13. A computer-assisted method comprising:
   receiving a request from a client for a change order for a sum of physical monetary items in a set of one or more monetary value denominations as specified by the client, at a computing device;

retrieving a predetermined monetary threshold from a memory device associated with the computing device;

comparing, by the computing device, the retrieved predetermined threshold with available cash of the client, to determine whether the available cash is below the predetermined threshold; and based on an outcome of the comparing, scheduling a physical shipment of the monetary items to the client in the set of one or more monetary value denominations to fill the change order through a communications channel when the available cash is determined to be below the predetermined threshold.

14. The method of claim 13, wherein the available cash is based on a total amount of cash.

15. The method of claim 13, wherein the available cash is based on a currency denomination amount.

16. A non-transitory computer-readable storage medium storing computer-executable instructions that, when executed, cause a processor to perform a method comprising:
receiving a request from a client for a change order for a sum of physical monetary items in a set of one or more monetary value denominations as specified by the client;
retrieving a predetermined threshold from a memory device;
comparing the retrieved predetermined threshold with available cash of the client, to determine whether the available cash is below the predetermined threshold; and
based on an outcome of the comparing, scheduling a physical shipment of the monetary items in the set of one or more monetary value denominations to the client to fill the change order through a communications channel when the available cash is determined to be below the predetermined threshold.

17. The non-transitory computer-readable medium of claim 16, wherein the available cash is based on a total amount of cash.

18. The non-transitory computer-readable medium of claim 16, wherein the available cash is based on a currency denomination amount.

19. The method of claim 1, further comprising:
adjusting the predetermined threshold.

20. The method of claim 1, wherein the requesting is further based on at least one selectable parameter.

21. The method of claim 20, wherein the at least one selectable parameter comprises a total transportation cost to date.

22. The method of claim 20, wherein the at least one selectable parameter comprises an amount of cash in transit or being processed at a cash vault.

23. The method of claim 20, wherein the at least one selectable parameter comprises a one-time charge for transportation.

24. The method of claim 20, wherein the at least one selectable parameter comprises a duration period.

25. The method of claim 13, further comprising:
establishing the predetermined threshold based on a specified frequency for a specified duration.

26. The method of claim 13, further comprising:
establishing the predetermined threshold for an event.

27. The method of claim 13, further comprising:
requesting an emergency change order that overrides any preset trigger.

28. A computer-assisted method comprising:
receiving a deposit request for a deposit of physical monetary items from a client, at a computing device;
retrieving a predetermined threshold from a memory device associated with the computing device;
adjusting the predetermined monetary threshold, using the computing device, for an expected deposit amount from a plurality of customers over a desired period of time;
comparing, by the computing device, the predetermined threshold with a deposit amount associated with the deposit request, to determine whether the deposit amount exceeds the predetermined threshold;
determining, by the computing device, whether a regularly scheduled physical pickup is scheduled within a predetermined time duration in the future; and
based on an outcome of the comparing and the determining, requesting an on-demand physical pickup of the deposit from the client through a communications channel when the deposit amount is determined to exceed the predetermined threshold and the regularly scheduled physical pickup is determined not to be scheduled within the predetermined time duration, such that the on-demand pickup is not requested when the regularly scheduled pickup is determined to be scheduled within the predetermined time duration.

* * * * *